United States Patent [19]

Yang

[11] Patent Number: 4,640,668
[45] Date of Patent: Feb. 3, 1987

[54] CEILING FAN WITH ADJUSTABLE BLOWING SCOPE THRU A SPEED-SERVO AND WITH DRIVING SPEED CONTROL MEANS

[76] Inventor: Tai-Her Yang, 5-1 Tay Pyng St., Shi Hwu Jenn, Jang Huah Shiann, Taiwan

[21] Appl. No.: 404,384

[22] Filed: Aug. 2, 1982

[51] Int. Cl.$^4$ ............... F04B 35/04; F04D 29/36
[52] U.S. Cl. ............... 417/354; 417/423 R; 416/5; 416/131; 416/170 R; 416/236 A; 310/68 E
[58] Field of Search ............... 417/424, 423 R, 354, 417/353, 352, 22; 416/131, 132 R, 132 A, 5, 236 A, 170 R, 98; 310/68 E

[56] References Cited

U.S. PATENT DOCUMENTS

| | | | |
|---|---|---|---|
| 1,409,090 | 3/1922 | Glasser | 416/98 |
| 2,119,398 | 5/1938 | Morse | 416/5 |
| 2,281,711 | 5/1942 | Peck et al. | 310/68 E |
| 2,670,447 | 2/1954 | Harmon | 310/68 E |
| 2,880,809 | 4/1959 | Wagner | 416/131 |
| 3,509,825 | 5/1970 | Sorensen | 417/36 |
| 3,667,022 | 5/1972 | Quinn | 417/36 |
| 4,382,400 | 5/1983 | Stutzman | 416/5 |

FOREIGN PATENT DOCUMENTS 478417 1/1938 United Kingdom .............. 416/5

Primary Examiner—Cornelius J. Husar
Assistant Examiner—Peter M. Cuomo
Attorney, Agent, or Firm—Cushman, Darby and Cushman

[57] ABSTRACT

A ceiling fan with adjustable blades and equipped with a motor including a centrifugally controlled motor speed control. The motor speed control includes an adjustable, centrifugally controlled electronic switch.

1 Claim, 43 Drawing Figures

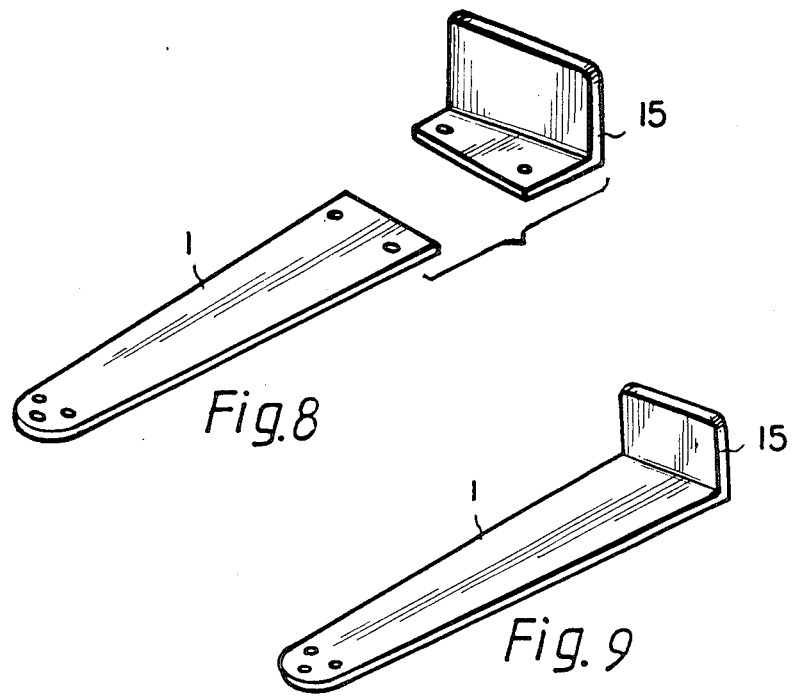
Fig. 8
Fig. 9
Fig. 10 　　　　Fig. 11
Fig. 12
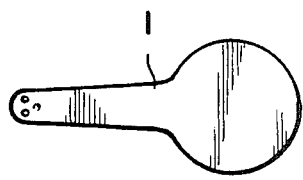 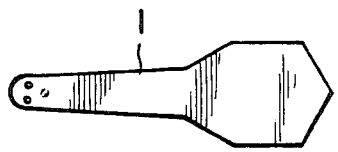
Fig. 13 　　　　Fig. 15
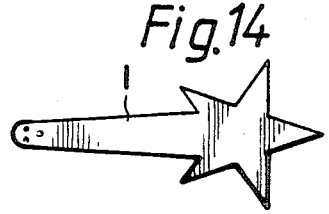
Fig. 14

4,640,668

CEILING FAN WITH ADJUSTABLE BLOWING SCOPE THRU A SPEED-SERVO AND WITH DRIVING SPEED CONTROL MEANS

SUMMARY OF THE INVENTION

This invention provides a ceiling fan with adjustable blowing scope thru a speed-servo and with driving speed control means. The servo-adjusting blowing scope may be obtained by means of the centrifugal force and the reaction force to vary the resultant blowing angle of the fan blades together with a related speed control means and some improvements of the driving motor.

BACKGROUND OF THE INVENTION

In the conventional ceiling electric fan, its blowing force may be varied by controlling its speed. Since the fan blades are the fixed type, the blowing scope is constant; therefore, it has the following drawbacks:

(1) When just several persons being present and requiring a smaller blowing scope, the fan still provides a large or constant blowing scope, which would cause energy to be wasted.

(2) When being used for cool or warm air circulation in a room, it will be unable to mix the temperature difference evenly because of the fixed blowing scope and dead angle, as shown in FIG. 1-1.

BRIEF DESCRIPTION OF THE DRAWINGS

FIG. 1-1 shows the function of the conventional ceiling fan.

FIG. 1-2 shows the function of ceiling fan of this invention.

FIG. 2 shows the structure of the blade with a movable shank in this invention.

FIG. 8 shows the end of the blade in this invention being furnished with a vertical and detachable vanes.

FIGS. 9-1 and 9-2 show some other embodiments of said vanes being attached to the blades in this invention.

FIG. 10 shows the end of said blade being made into a curved shape.

FIG. 11 shows the whole blade being in a suitable curved shape.

FIGS. 12 thru 23 show the blade end being made in various patterns.

DETAILED DESCRIPTION

Figure 1:
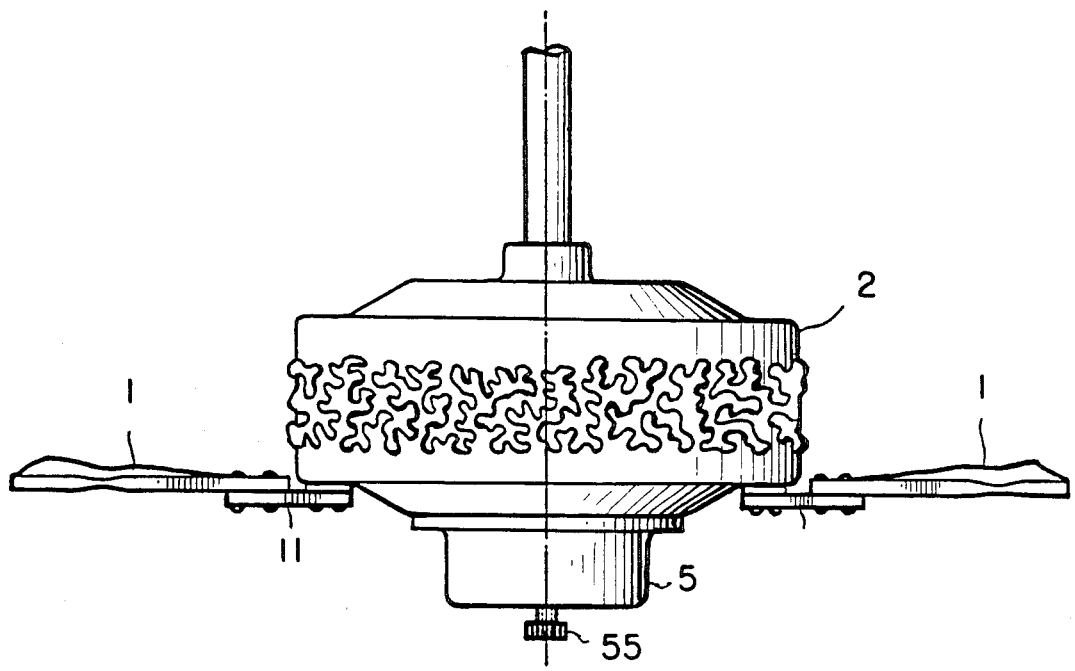
FIG. 1 shows the structure of this invention.
Figure 1:
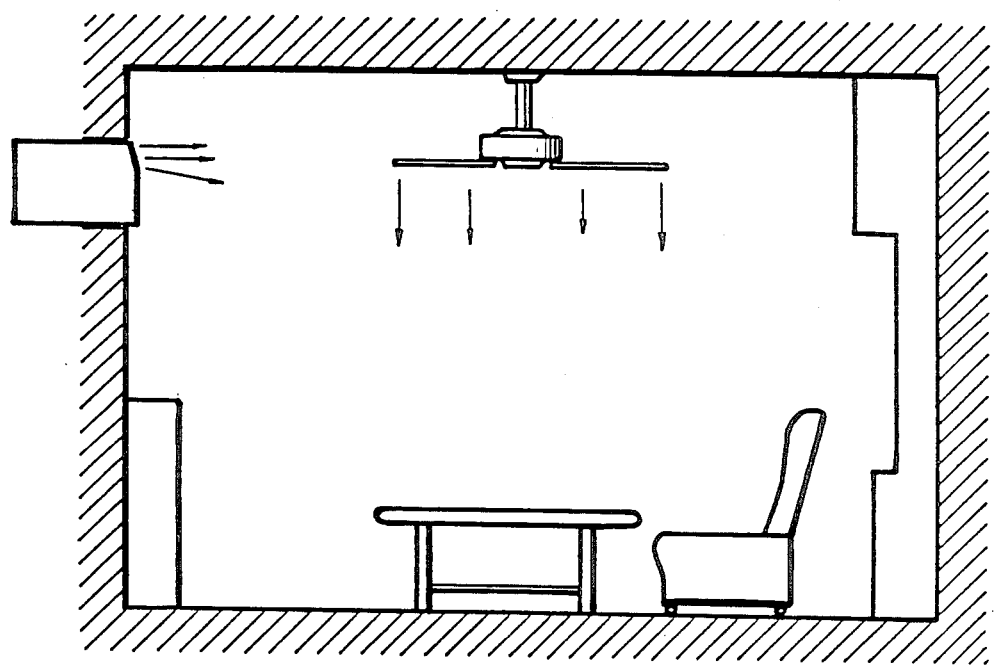
Figures 1, 2:
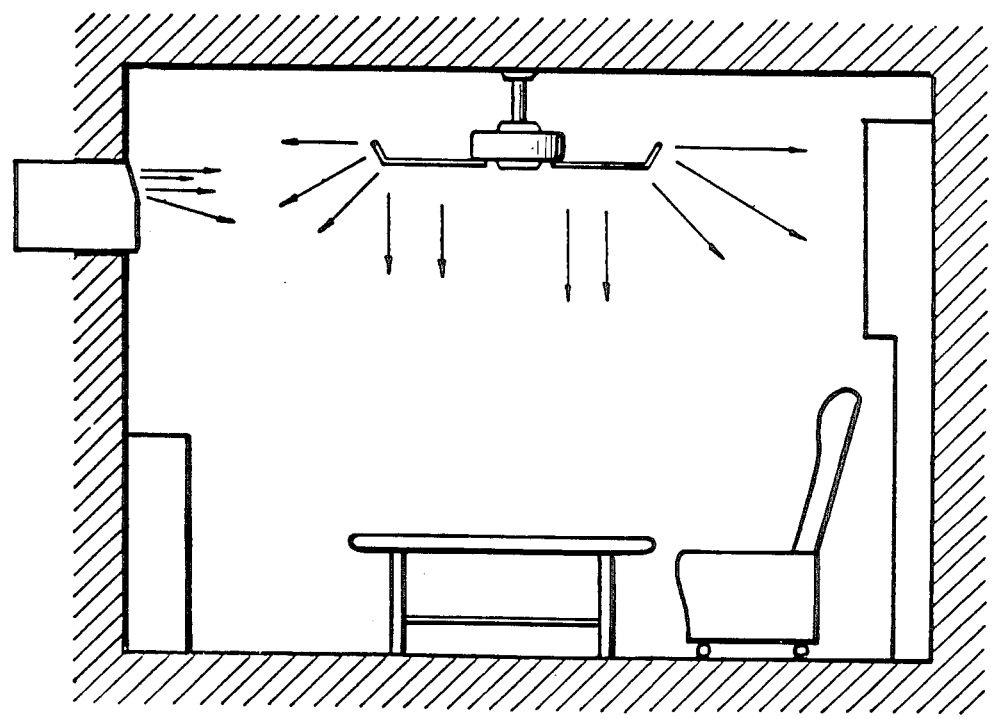
Figure 2:
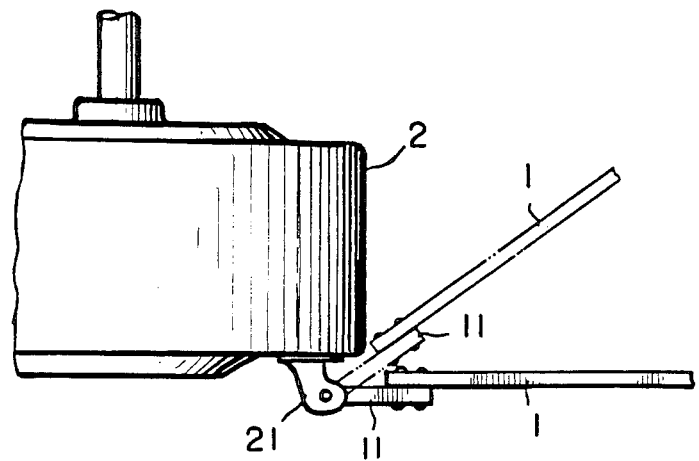

The ceiling fan of this invention as shown in FIG. 1 is particularly designed for the purpose of eliminating the drawbacks of the conventional ceiling fan. The structure and feature of this invention are further described by referring the drawings attached as follows:

(a) Fan balde structure:

In the conventional ceiling fan, the fan blades are directly or indirectly thru a shank fixed to the top or the bottom of the outer case of the driving motor at a fixed angle one another; as a result, the blowing scope (either upwards or downwards) is constant. The fan blade structure in this invention has an angular variation between the upper and the lower lever limits. Upon the fan rotating, the fan blades will generate a centrifugal force or a reaction force by blowing the air to vary the blowing scope for minimizing the temperature difference in a room as shown in FIG. 1-2; the aforesaid effect may also be obtained by manually setting the horizontal angle of the fan blades.

The configuration of fan blades is described as follows:

(1) FIG. 1 shows the fan blade (1) made of a flexible material, and the horizontal angle of said blade (1) will change upon the rotation speed of the fan varying as a result of the reaction force of blowing pressure. The middle portion of said blade may be a little thinner so as to form a suitable elevation angle at the end of blade upon a reaction force being applied thereto by the rotating speed of the fan.

As soon as an elevation angle is formed to the blade, the blowing scope of the fan is enlarged. Further, more portions of said blade (1) may be made thinner so as to form some curved surface on said blade during rotating at a given speed for increasing the air agitating effect.

(2) FIG. 2 shows the shank (11) of blade (1) being attached to the shank seat (21) on the outer case (2) of motor in pivotal manner. Upon the blades (1) being driven by the motor to rotate, said blades (1) will move upwards at a given angle of elevation because of the reaction force caused by the air stream; the degrees of said angle of elevation is hinged on magnitude of said reaction force of air stream. The angles of elevation and depression may be limited with a mechanism, such as, a guide channel, adjustable screw, or a bayonet means, and adjusted manually.

Figure 3:
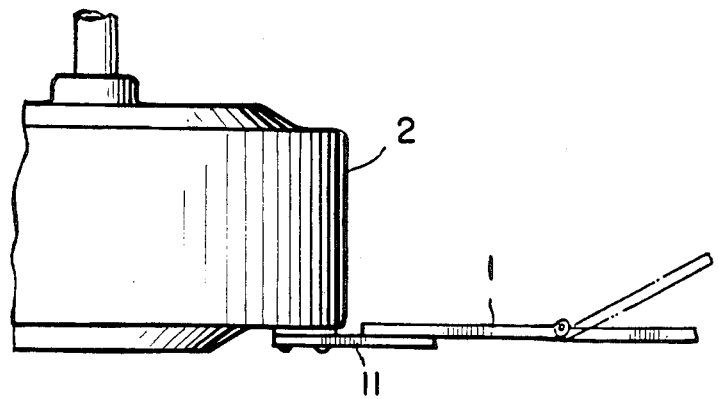
FIG. 3 shows the middle portion of said blade being furnished with a movable means.

(3) FIG. 3 shows that said blade (1) may be made of two or more than two section; in the middle portion, a pivot mechanism is used for connecting the different sections. Upon the blades being driven with the motor to rotate, a limited angle of elevation or depression will be formed as a result of reaction force of air stream, and the blowing scope will also be varied. In said pivotal joint portion, a manual adjustment mechanism as mentioned in (2) for adjusting the limited angle may be furnished.

Figure 4:
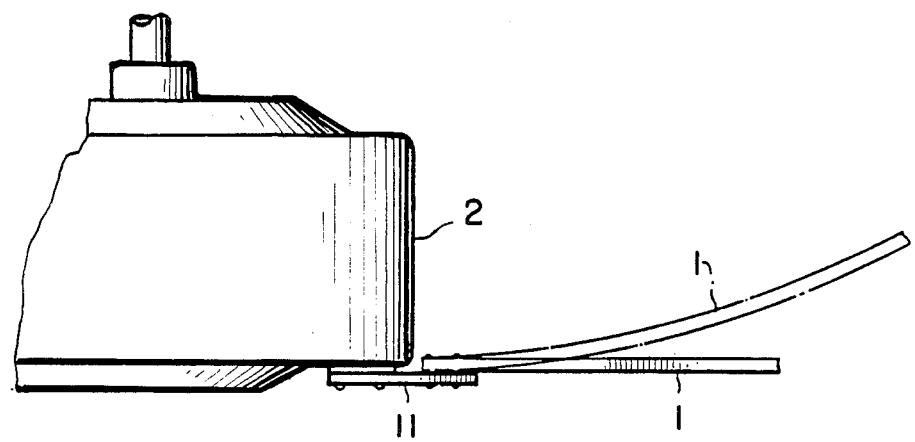
FIG. 4 shows the blade in this invention being made of a flexible material.

(4) FIG. 4 shows the blade (1) being made of a material having excellent flexibility; toward the end of said blade, the blade becomes thinner and thinner. Upon said blades being rotated, it will form an angle of elevation from the shank (11) portion as a result of reaction force of air stream, and the blowing scope is varied simultaneously. Further, said blade (1) may be made in such a shape that it becomes thinner and thinner from the middle portion toward the end.

Figure 5:
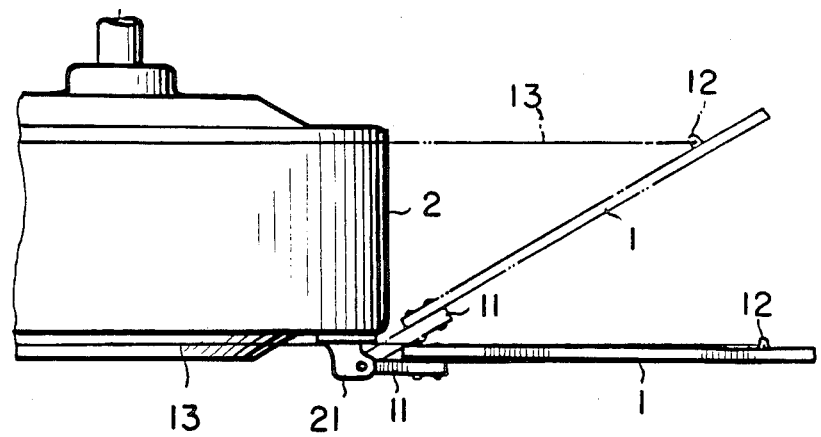
FIG. 5 shows the horizontal angle of the blade being adjusted with a cord.

(5) FIG. 5 shows the shank (11) and the shank seat (21) of said blade (1) are connected each other in a pivotal manner; on said shank seat (21), a depressing spring is furnished to press said blade always downwards; or have the blade (1) always overcome the counter force of its maximum rotation speed. The weight of said blade may, in addition to the weight of itself, be obtained from an external weight means. Also, on the back side of blade (1), a lug (12) with a small hole may also be furnished so as to be fastened with a cord (13) for adjusting the elevation angle of said blade (1) by varying the length of said cord (13) manually; then, the blowing scope may be suitably adjusted.

Figure 6:
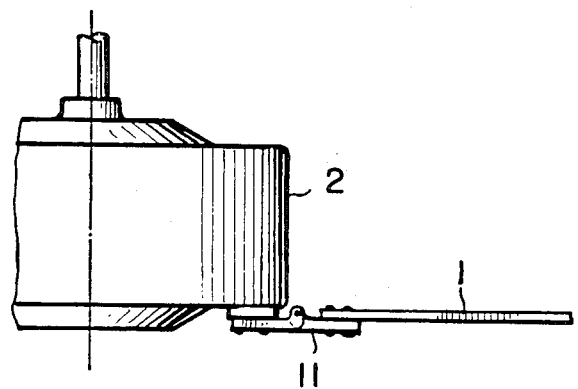
FIG. 6 shows the middle portion of said shank of said blade in this invention being furnished with a movable means.

(6) The aforesaid structures mentioned in (5) and (2) may also be modified to have the middle portion of said shank (11) in a pivotal joint manner as shown in FIG. 6; said pivotal connection may also be suitably furnished in other portion; or may be furnished with an adjusting mechanism as mentioned in (2) so as to obtain the same result in unlarging the blowing scope.

Figure 7:
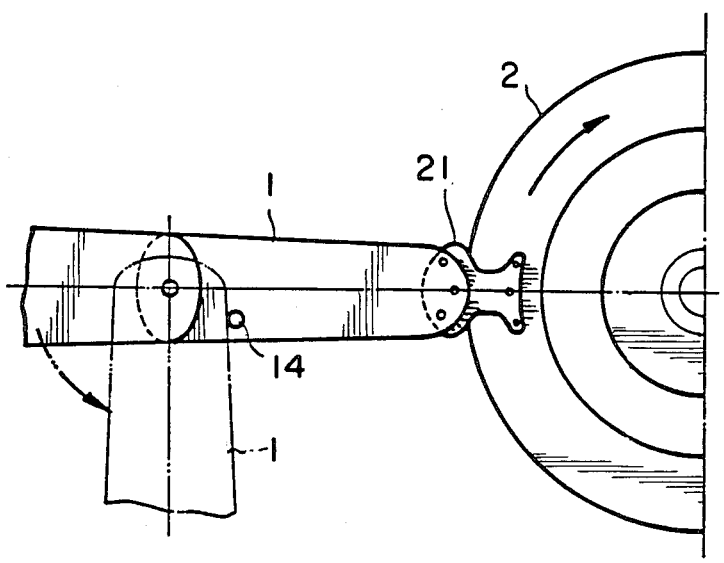
FIG. 7 shows the middle portion of the blade in this invention being furnished with an adjustable structure.

(7) FIG. 7 shows said blade (1) being furnished with a pivotal mechanism in the middle portion. The end of said blade (1) will sweep backwards in proportion to the reaction force of air stream during the fan rotating, and at a suitable point on the fixed portion of said blade (1), a stop piece (14) is furnished to limit the back-swept angle of said movable blade portion. The feature of said design is to reduce the air resistance and the blowing scope upon the motor rotating to a given high speed so as to protect the operational life and safety as well.

(8) The aforesaid new structures of the blades (1) not only can be used separately, but also can be used jointly.

Figures 1, 9:
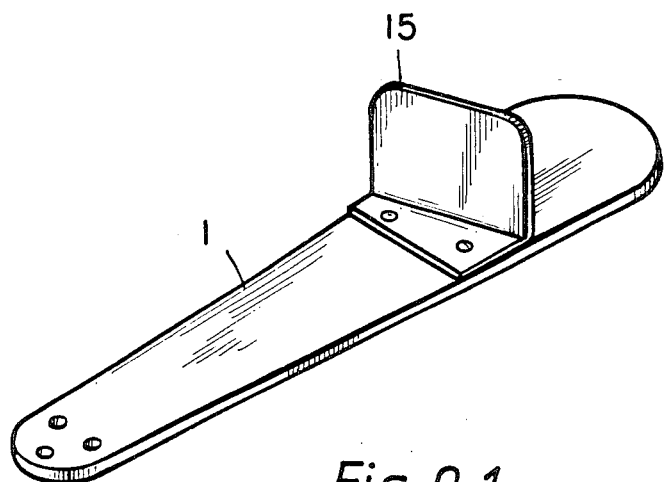
FIG. 9 shows the end of said blade being furnished with a fixed vertical vanes.
Figures 2, 9:
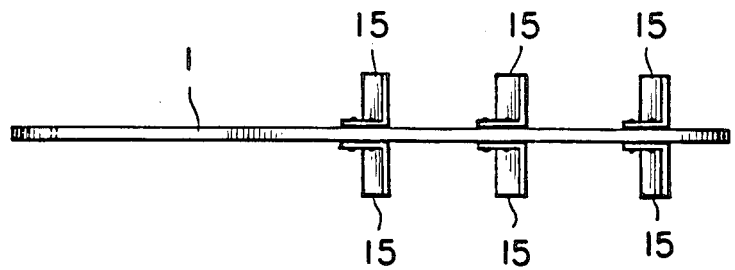
Figure 16:
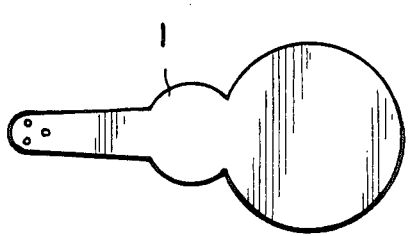
Figure 17:
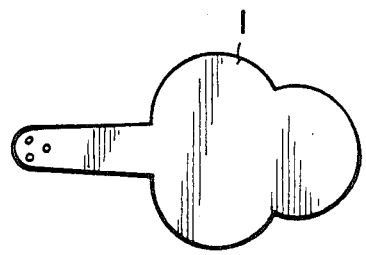
Figure 18:
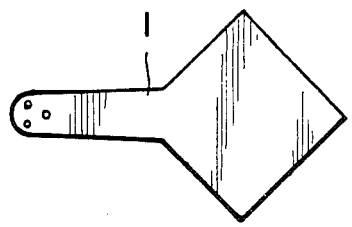
Figure 19:
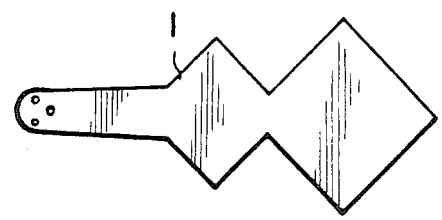
Figure 20:
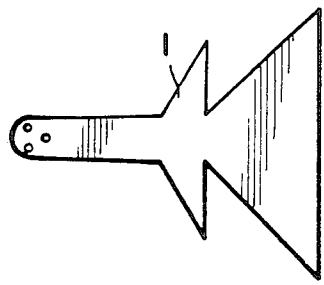
Figure 21:
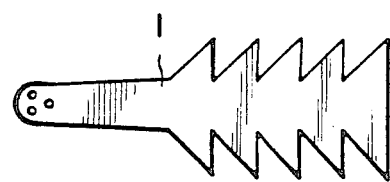
Figure 22:
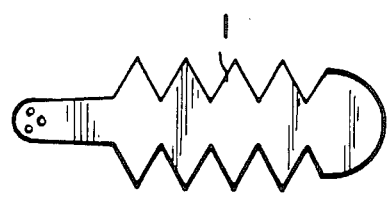
Figure 23:
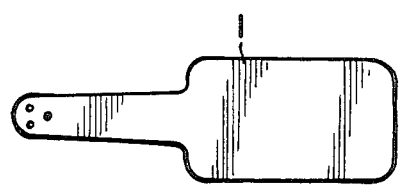

(9) At the end of said blade (1), an upward or downward vane (15) at a given oblique angle or a right angle may be provided as shown in FIG. 8. In addition to being detachable, said vane (15) may be molded integrally into one piece as shown in FIG. 9. Moreover, at a suitable position on the top or the bottom surface, or the both surfaces of said blade (1), one or more than one vane (15) may be attached as shown in FIGS. 9-1 and 9-2. The object of said feature is to have the blades (1) agitate the air stream outwards so as to increase the blowing scope.

(10) FIGS. 10 and 11 show another embodiment of said blade (1), of which the end of blade (1), of which the end of blade bends upwards, or the whole body bends gradually upwards for the same function as the preceding structures. In addition, the blade (1) in said design may be made to bend downwards or in corrugated shape.

(11) In addition to the aforesaid designs, the end of said blade (1) may also be in the shapes as shown in FIGS. 12 thru 23 or other suitable geometric shapes for the purposes of not only obtaining the aforesaid functions but also feeling an artistic atmosphere. The aforesaid various kinds of blade structures may, in addition to being attached to the lower portion of the fan outer case (2), be attached to the upper portion or other appropriate position on said outer case (2).

Figure 31:
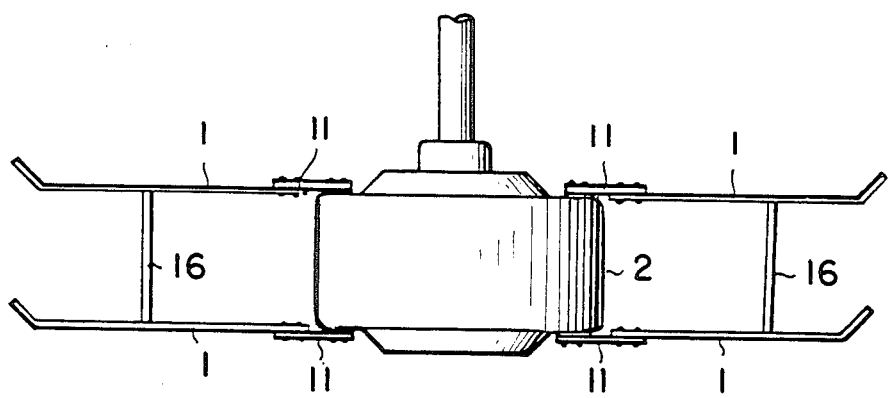
FIG. 31 shows a multi-layer blade structure of the present invention.
Figure 32:
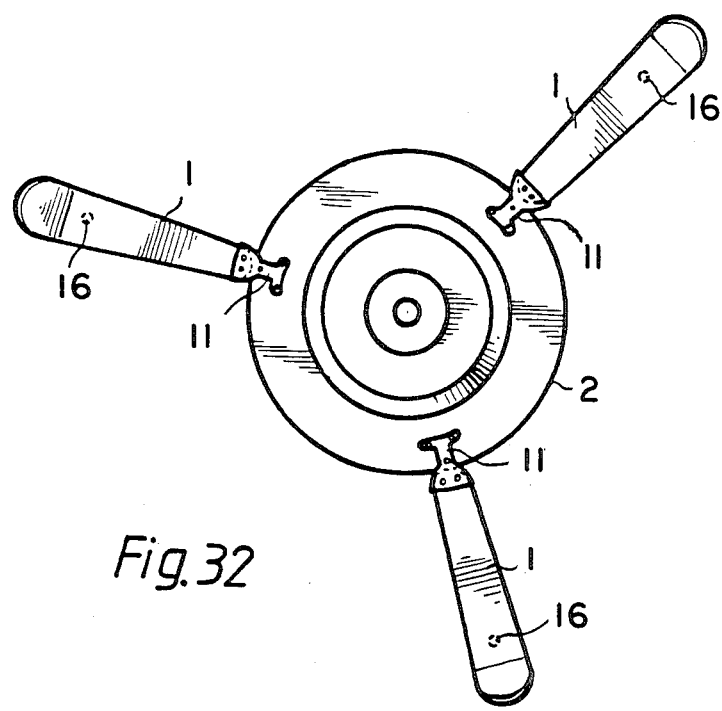
FIG. 32 shows a top view of FIG. 31.
Figure 33:
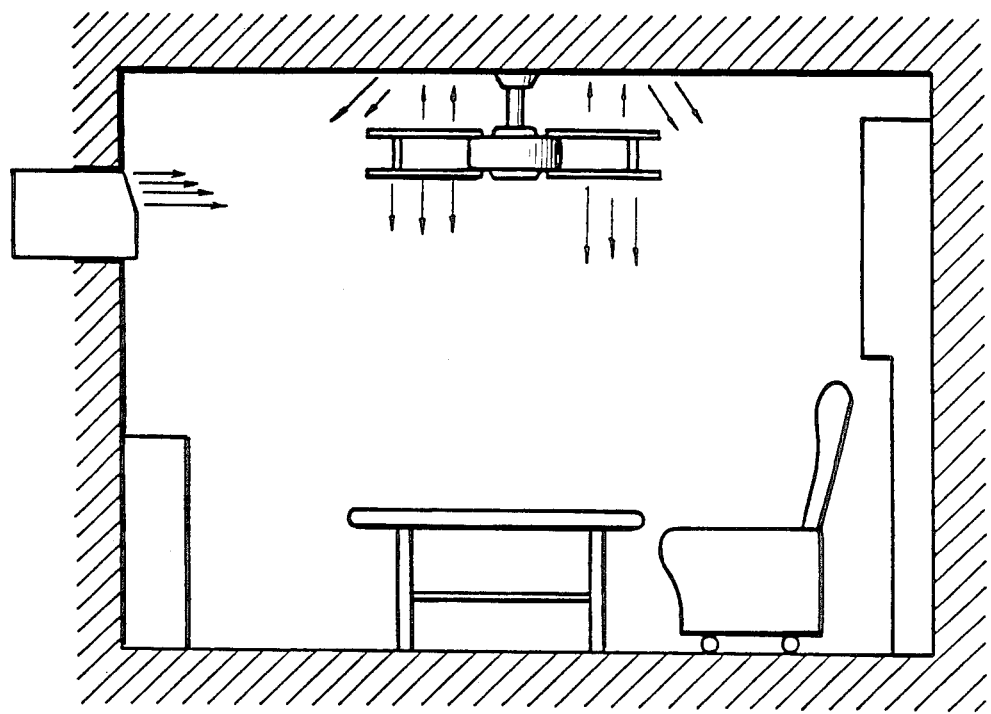
FIG. 33 shows the functions of FIG. 31.
Figure 34:
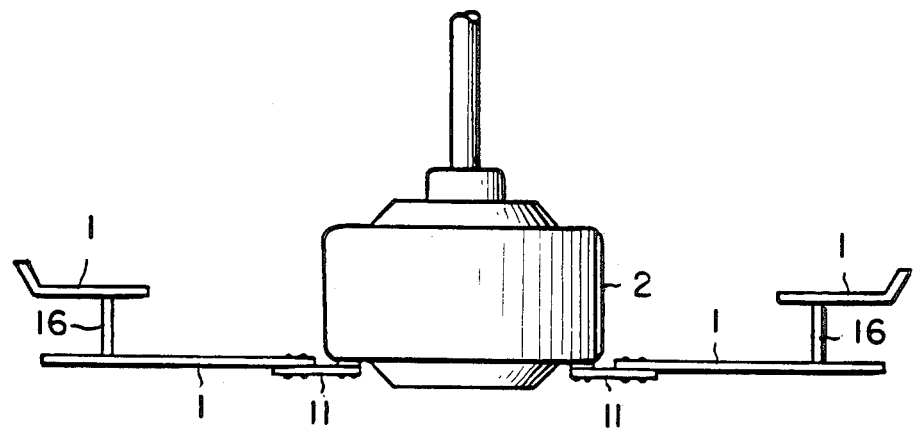
FIGS. 34 thru 36 show the other types of embodiment in FIG. 31.
Figure 35:
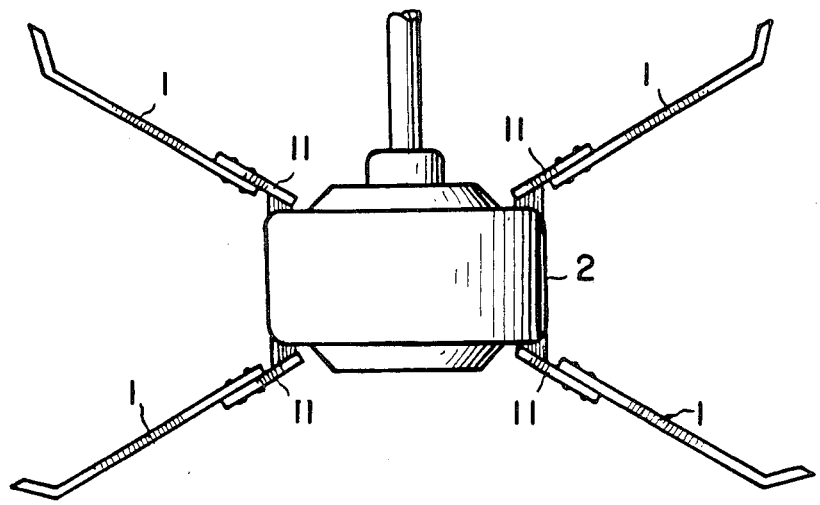
Figure 36:
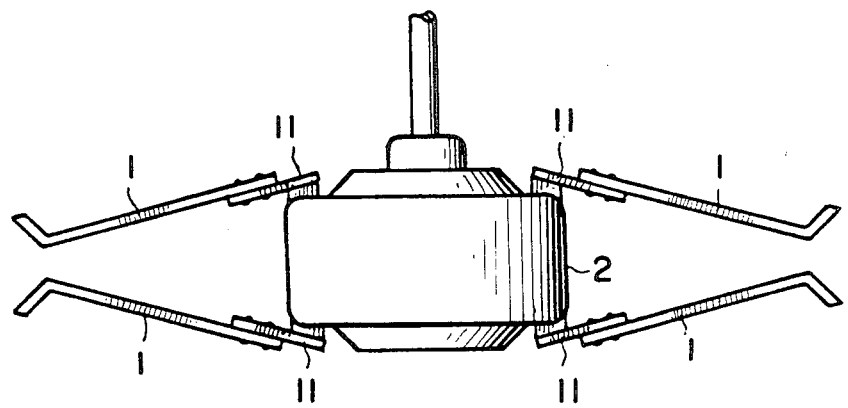

(12) The blade (1) structure of the present invention may also be made of a selected material, and may have two or more than two layers of blades (or multi-layer) as shown in FIGS. 31 and 32 so as to provide simultaneously the same direction or different direction air streams during rotation. The air stream agitation may be optionally selected for either one-way or two way agitation as shown in FIG. 33. Between or among said multi-layer blades, an auxiliary supporting rod (16) may be used for mutual fixing function. FIG. 34 shows another embodiment of said multi-layer type of blade structure, in which one or more than set of blades may be fixedly attached to the rotary portion of motor, and the rest blades may be attached to the former blades respectively. FIGS. 35 and 36 show still another embodiments of said blade structure.

b. The driving motor:

This invention not only can use the conventional A.C. or D.C. motor with speed control means, but also use a new induction motor, which is provided with an un-equal-spaced iron core magnetic circuit for better performance. Since the starting winding of the conventional single phase A.C. induction motor has to be connected in series with a capacitor or a resistor or a inductor for phase spitting start, the inductive reactance between the starting and the running windings from the starting to the normal running period can not be varied consistently or correspondingly. Further, the space between the stator and the rotor of a motor should also be varied; however, in the conventional motor, the space between the stator and rotor is fixed. As a result, noise and poor torque will be generated during the starting period.

Figure 24:
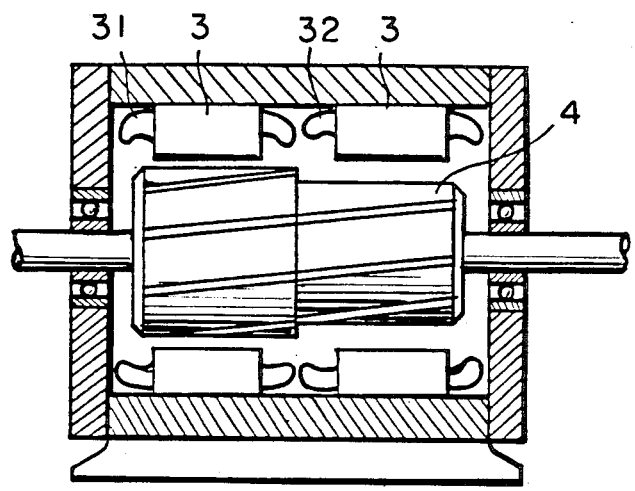
FIG. 24 shows the induction motor in this invention being furnished with an un-equal-spaced iron core magnetic circuit structure.
Figure 25:
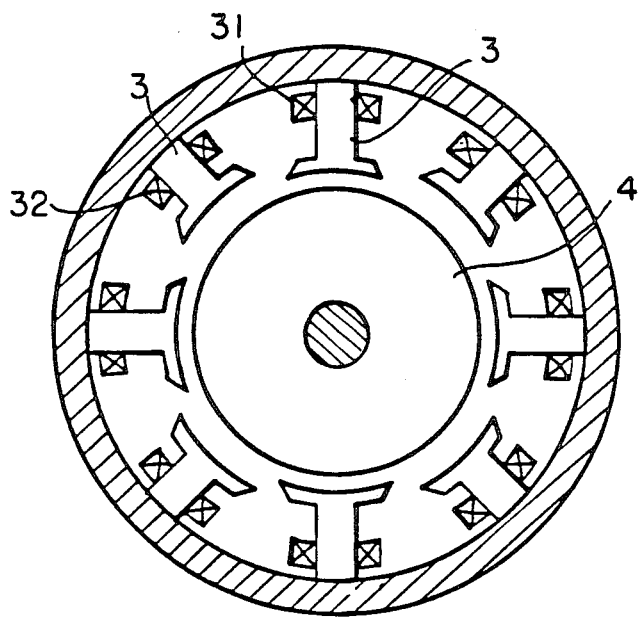
FIG. 25 shows a driving motor structure in this invention being furnished with magnetic poles having different length.

In this invention, the feature of said un-equal-spaced iron core magnetic circuit induction motor is that the starting winding poles (31) of the stator (3) are separate iron cores on a same axis which may have equal or un-equal length (shown in FIG. 24). The rotor (4) of this invention has different diameters at a given portion looking like a staircase so as to provide a different space between the magnetic poles of the starting winding (31), the running winding (32), and the rotor (4), i.e., to obtain different magnetic flux distribution so as to improve the starting noise. Another embodiment of this invention is a common stator (3) for the starting winding and the running winding as shown in FIG. 25. The starting and the running magnetic poles of said stator (3) are different in length, and surrounding a parallel and cylindrical-shaped squirrel cage rotor (4) so as to obtain the same result of different spaces between the running winding poles, the starting winding poles, and the rotor.

Figure 26:
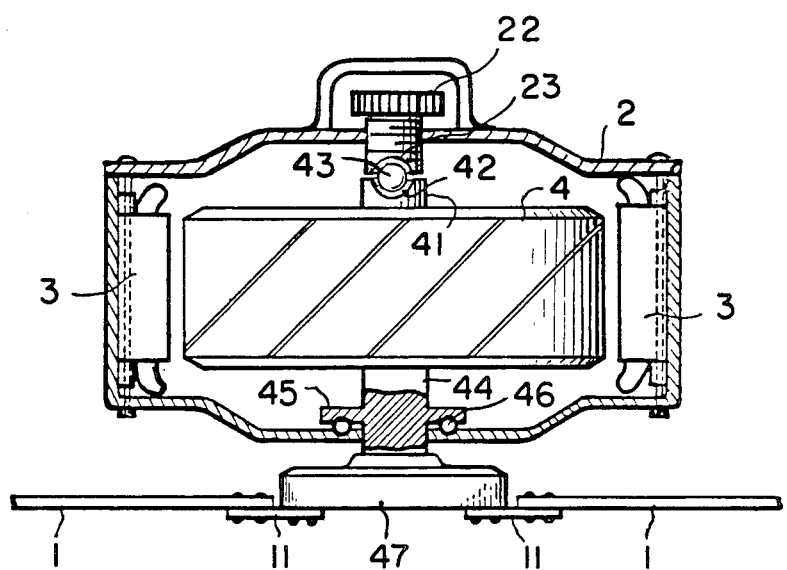
FIG. 26 shows the driving motor of the ceiling fan being furnished with an inside type of rotor.

FIG. 26 shows an embodiment of the driving motor having a thrust bearing. In said Fig., the upper shaft end (41) of the rotor (4) is furnished with a steel ball socket (42), and on the top center of said outer case (2), an adjusting positioning screw (22) is installed; at the lower end of said screw (22), a ball socket (23) is also provided to house a steel ball (43) for minimizing the friction. At the lower shaft end (44) of said rotor (4), a flange (45) is furnished, and at the bottom of said flange (45), a ring-shaped groove is provided. On the bottom of said outer case (2), a similar and corresponding ring-shaped groove is also furnished; between said two ring-shaped grooves, a given number of steel balls (46) are installed for minimizing the friction.

Figure 27:
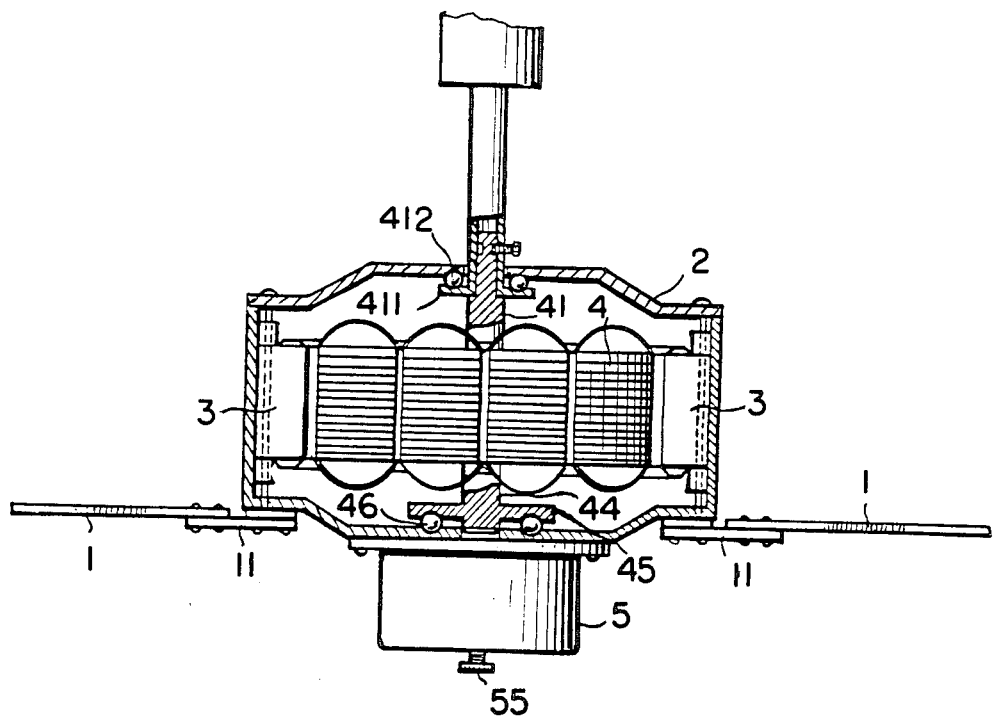
FIG. 27 shows the ceiling fan being furnished with an inner or outer rotor type of driving motor.

The lower shaft end (44) of the rotor (4) extends out of said outer case (2) and is connected to a positioning disk (47), which is used for attaching the blades (1). FIG. 27 shows an embodiment of motor which may be used for an inner or outer rotor. In FIG. 26, the fan blades (1) are driven with the shaft (44) of rotor (4), but in FIG. 27, the blades (1) are driven with said outer case (2), and in which the upper shaft end (41) of the rotor (4) is put thru a flange bush (411) having a ring-shaped groove that is corresponding to the ring-shaped groove under the top of ourter case (2) so as to house several steel balls (412). At the lower shaft end (44) of said rotor (4), a flange (45) having a ring-shaped groove underneath is furnished; said ring-shaped groove is similar and corresponding to that furnished inside the bottom of said outer case so as to house several steel balls (46). The purpose of housing said steel balls (46) therein is to minimize the friction during the fan rotating.

c. Speed control means:

The speed control method used in the conventional ceiling fan is a triac phase control method being connected with a variable resistor. In this invention, two new speed control means are used, and they are:

(1) A centrifugal-means-controlled triac is used for regulating the speed. In said triac (or thyristor), the collector and the base are connected to the normal closed contacts of a centrifugal switch. Said thyristor is connected in series with the driving motor of the ceiling fan, and then both of them are connected in parallel with the A.C. power supply.

Figure 28:
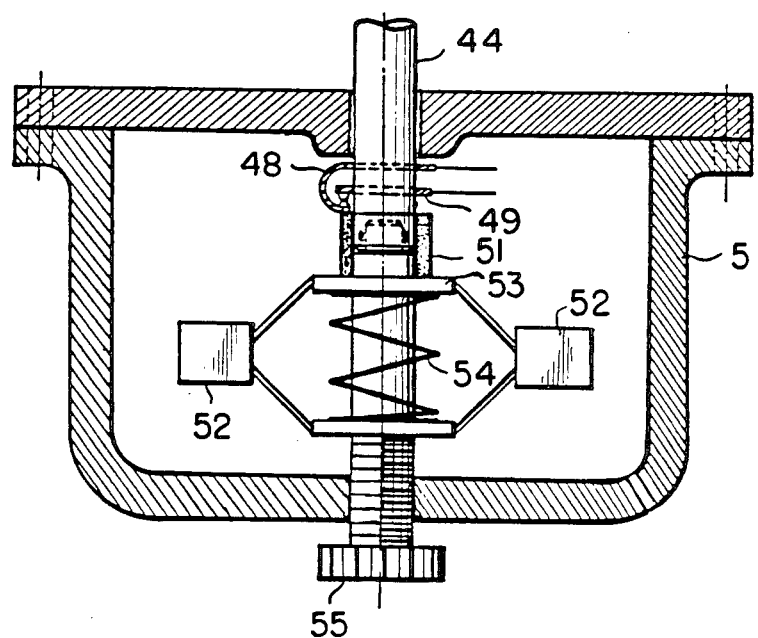
FIG. 28 shows the structure of a centrifugal switch type of speed control means in this invention.
Figure 29:
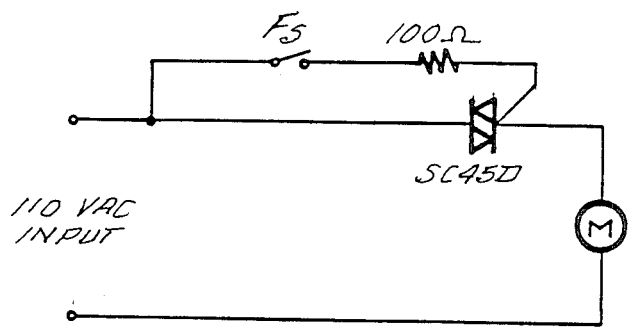
FIG. 29 shows a schematic diagram of said centrifugal switch type of speed control means in this invention.

Upon the motor driving the ceiling fan to rotate to the setting speed of said centrifugal switch, said switch will cut off the power supply immediately. Said driving motor will gradually reduce its running speed as a result of inertia. As soon as the running speed is reduced to a low speed to cause said centrifugal switch to be closed again, said driving motor is again energized to increase its rotating speed; thus, the ceiling fan will run in such a on-off and on-off intermittent manner so as to fulfil the purpose of speed control. FIG. 28 shows the structure of said centifugal means, and FIG. 29 shows the control circuit of said means.

The lower shaft end (44) of said rotor (4) extends downwards out of the outer case (2), and then enters into the centrifugal means (5); on said lower shaft end (44), two conducting pieces (48,49) are installed, and closely contact each other under normal state because of being pressed by the insulating block (51). Upon said centrifugal means (5) rotating together with the outer case (2) and reaching a speed preset, the sliding piece (53) will generate a pressing preset, the sliding piece (53) will generate a pressing effect to the spring (54) as a result of the weighted blocks (52) being pulled by a centrifugal force, and then the insulating block (51) will be pulled downwards to cause said two conducting pieces (48, 49) to separate from each other to cut off the power supply to said driving motor. Upon the running speed of said driving motor reducing to the setting speed and the centrifugal force being diminished, said spring (54) will push said insulating block (51) upwards to have said two conducting pieces (48, 49) contacted each other, and the driving motor is energized again. Upon the fan rotating to a preset speed again, the aforesaid centrifugal force effect will take place repeatedly, and so on; then, the speed regulating purpose is fulfilled. Further, said centrifugal means may be preset at any speed desired to cut off the power supply by means of a screw (55) to adjust the tension of the spring (54).

Figure 30:
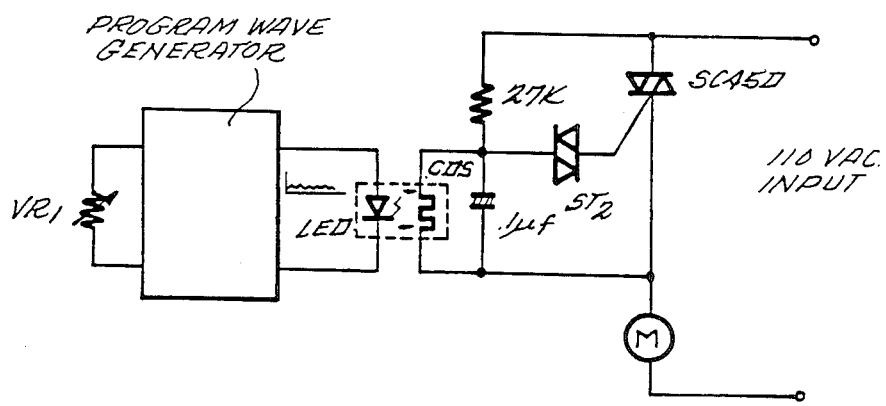
FIG. 30 shows a schematic diagram of a programmed speed control means in this invention.

(2) A programmed speed control method:

It is an analog or digital type of controllable cycle signal generator, which drives a lamp or a "CDS" so as to generate a corresponding reactance variation to the both ends of a capacitor connected in parallel to a phase control circuit, or to a "CDS" connected in series to capacitor C as a delay charging resistance; then, by means of said reactance, a programmed control to the fan speed is done, and by means of the aforesaid various types of horizontal angle blades (1), the corresponding blowing scope and blowing force are obtained. FIG. 30 shows a circuit of said control function.

d. The outer case structure of said ceiling fan:

On the outer case (2) of the motor of the conventional ceiling fan, some beautiful designs or some ceiling fan, some beautiful designs or some colors are usually furnished for decoration purpose. However, said decorative designs or colors are apt to peel off of crack after a period time as a result of weather factors. Moreover, the outer case is usually in cylindrical or polygon shape, it is rather difficult to paint designs or characters on said outer case.

Figure 37A:
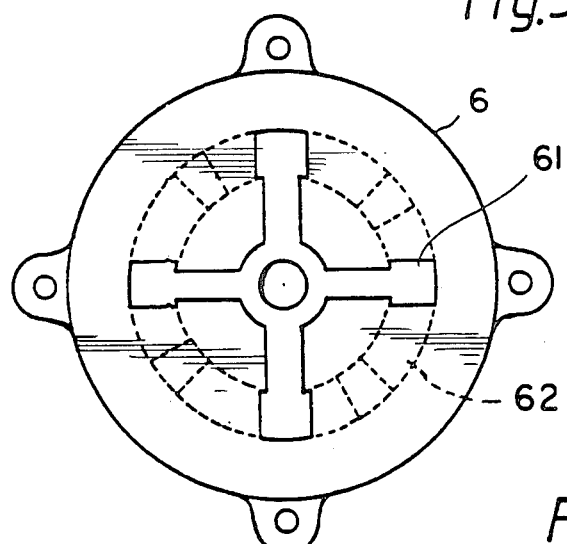
FIG. 37A shows an embodiment of a plane view of the positioning disk of said ceiling fan in the present invention.
Figure 37B:
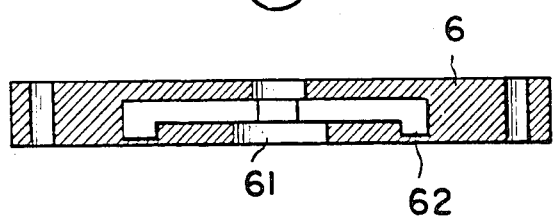
FIG. 37B shows a cross-sectional view of the positioning disk in FIG. 37A.
Figure 38:
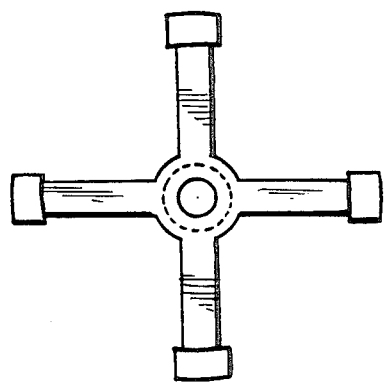
FIG. 38 shows the top structure of the fan shank of said ceiling fan.

In order to eliminate the aforesaid drawbacks on outer case decoration, this invention has provided a flexible coating material for painting a flexible outer case structure with an embossed design. In doing that, place the sheet or belt shaped metal or other flexible materials on a flat surface, and then paint manually some color and embossed designs or patterns with the flexible coating liquid or semi-solid coating material thereon; then, dry it by baking or in natural temperature. At last, properly assemble said painted and dried sheet or belt shaped metal into the outer case of the fan. The assembling method of said outer case may use the general welding, spot weld, or other known mechanical joint method. Since the coating material for said outer case is flexible, it would not be peeled off or cracked during the metal sheet or belt being processed. Further, the feature of said outer case is easy for the painter to control the size during painting the patterns, and not to worry about the random flowing of the paint so as to maintain the perfect appearance of the outer case.

e. The positining method of said ceiling fan may be done by means of a positioning disk (6) and the fan shank to be coupled each other by inserting method. Said positioning disk (6) as shown in FIG. 37 has a cross groove (61) underneath, and said cross neath, and said cross groove is furnished with a guide groove (62). The top end of said fan shank is formed into a cross with a flange-shaped piece at each end of said cross as shown in FIG. 38. Upon the top end of said fan shank being inserted into the cross groove (61) of said positioning disk (6), rotate said fan shank at a suitable angle for properly positioning the fan.

I claim:

1. A ceiling fan comprising:
an outer case having a ring-shaped groove under a top portion thereof and having a ring-shaped groove under a bottom portion thereof;

a driving motor, housed in said outer case, having a rotor with upper and lower shaft portions;

a first flange bushing positioned at said top portion of said case and having a ring-shaped groove corresponding to the ring-shaped groove under the top portion of said outer case;

a second flange connected to said lower shaft portion, said second flange positioned at said bottom portion of said case and having a ring-shaped groove corresponding to the ring-shaped groove under the bottom portion of said outer case;

steel balls positioned in a first track defined by said ring-shaped groove in said first flange bushing and the corresponding ring-shaped groove in said top portion of said outer case;

steel balls positioned in a second track defined by said ring-shaped groove in said second flange and said corresponding ring-shaped groove under said bottom portion of said outer case;

an adjustable blade structure attached to said outer case, said adjustable blade structure consisting of a plurality of fan shank seats, each said fan shank seat having a base and a pivot joint, each said fan shank base attached to said outer case, a plurality of fan shanks, each shank respectively pivotably mounted on a said pivotal joint of a said fan shank seat, a plurality of fan blades, each said fan blade respectively attached to a said corresponding said fan shank; and means for motor speed control, wherein said motor speed control means includes an adjustable centrifugally controlled triac, said triac providing an intermittent power whereby power to the motor is interrupted on an intermittent basis to thereby regulate the motor speed, said triac having a collector and a base, a centrifugal switch, said collector and said base electrically connected to said centrifugal switch, said triac is electrically in series with said driving motor which are then connected in parallel with an AC power supply, said lower shaft portion of said rotor coupling with said centrifugally controlled means, said centrifugally controlled means including two conducting pieces installed in close abutting contact on the lower end of said shaft portion, biasing means comprising a sliding piece connected with a pair of weighted blocks and a spring, an insulating block, said biasing means biasing said insulating block, said insulating block then in turn urging said two connecting pieces into electrical contact, whereby when said centrifugally controlled means rotates together with said outer case and reaches a preset speed, the said insulating block will be pulled downwardly and said two conducting pieces will thus separate from each other to thereby interrupt the power supply circuit to said driving motor such that the running speed of driving motor reduces below said preset speed and whereby said biasing means will urge said insulating blocks upwardly against said conducting pieces to re-make electrical contact between said conducting pieces; and said centrifugally controlled means may be set at said preset speed by adjusting the tension of said biasing means by means of a screw.

* * * * *